United States Patent
Li et al.

(10) Patent No.: US 12,146,535 B2
(45) Date of Patent: Nov. 19, 2024

(54) CLUTCH CONTROLS FOR ELECTRIC VEHICLE TRANSMISSION WITH MODULAR ACTUATION SYSTEM

(71) Applicant: GM Global Technology Operations LLC, Detroit, MI (US)

(72) Inventors: Dongxu Li, Troy, MI (US); Michael Ding, Mayfield Heights, OH (US); Bryan John Williams, Woodway, TX (US); Chunhao J. Lee, Troy, MI (US); Zhen J. Zhang, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 105 days.

(21) Appl. No.: 17/984,471

(22) Filed: Nov. 10, 2022

(65) Prior Publication Data

US 2024/0159280 A1    May 16, 2024

(51) Int. Cl.
  *F16D 48/06* (2006.01)
(52) U.S. Cl.
  CPC ...... *F16D 48/066* (2013.01); *F16D 2500/102* (2013.01); *F16D 2500/3024* (2013.01); *F16D 2500/3065* (2013.01); *F16D 2500/3067* (2013.01); *F16D 2500/30803* (2013.01); *F16D 2500/30806* (2013.01); *F16D 2500/3165* (2013.01); *F16D 2500/70217* (2013.01); *F16D 2500/7041* (2013.01); *F16D 2500/70454* (2013.01); *F16D 2500/7061* (2013.01)

(58) Field of Classification Search
  CPC ......... F16D 48/066; F16D 2500/10412; F16D 2500/102–1028; F16D 2500/3024; F16D 2500/3067; F16D 2500/3065; F16D 2500/3165; F16D 2500/70217; F16D 2500/70406; F16D 2500/7041; F16D 2500/70412; F16D 2500/70454; F16D 2500/30806
  See application file for complete search history.

(56) References Cited

U.S. PATENT DOCUMENTS

| | | | |
|---|---|---|---|
| 2004/0159520 A1* | 8/2004 | Anwar | F16D 48/066 192/85.61 |
| 2006/0272919 A1* | 12/2006 | Kawamoto | F16H 61/061 192/109 F |
| 2010/0250079 A1* | 9/2010 | Kawamoto | F16D 48/066 701/68 |
| 2011/0208396 A1* | 8/2011 | Otanez | F16D 48/066 701/67 |
| 2012/0232766 A1* | 9/2012 | Einfinger | F16D 48/066 701/67 |

(Continued)

*Primary Examiner* — Timothy Hannon
(74) *Attorney, Agent, or Firm* — CANTOR COLBURN LLP (57) ABSTRACT

A vehicle includes a transmission that performs a method of operating a clutch of a vehicle. The vehicle includes the clutch, an actuator device and a processor. The actuator device includes a piston movable to operate the clutch. The processor is configured to receive a pressure signal indicative of a selected fluid pressure for operating the clutch, determine a position for the piston in the actuator device from the pressure signal, and move the piston to the position to operate the clutch at the selected fluid pressure.

20 Claims, 5 Drawing Sheets

(56) References Cited

U.S. PATENT DOCUMENTS

| | | | |
|---|---|---|---|
| 2012/0277964 A1* | 11/2012 | Bai | F16D 48/066 701/67 |
| 2015/0260238 A1* | 9/2015 | Moorman | F16D 25/14 701/67 |
| 2016/0069402 A1* | 3/2016 | Chimner | F16D 48/066 701/67 |
| 2022/0042557 A1* | 2/2022 | Tabata | F16D 48/066 |
| 2022/0316537 A1* | 10/2022 | Gelmini | F16D 48/066 |

* cited by examiner

CLUTCH CONTROLS FOR ELECTRIC VEHICLE TRANSMISSION WITH MODULAR ACTUATION SYSTEM

INTRODUCTION

The subject disclosure relates to transmissions in electric vehicles and, in particular, to a system and method for controlling an actuator device of a clutch of a transmission.

An electric vehicle includes an electric motor for generating a motor torque and a transmission that converts the motor torque for application at wheels of the vehicle. An automatic transmission includes a clutch and a clutch actuator that engages and disengages the clutch. Use of an electric motor requires few gear states and therefore allows for simplification of the clutch. Use of a position-based clutch actuator generally leads to instabilities at the electric motor. Accordingly, it is desirable to provide a method for controlling operation of the clutch actuator to reduce instabilities.

SUMMARY

In one exemplary embodiment, a method of operating a clutch of a vehicle is disclosed. A pressure signal is received at a processor, the pressure signal indicative of a selected fluid pressure for operating the clutch. A position for a piston of an actuator for the clutch is determined from the pressure signal at the processor. The piston is moved to the position to operate the clutch at the selected fluid pressure.

In addition to one or more of the features described herein, the method further includes determining the position from the pressure signal using a transfer function. The transfer function determines the position based on the pressure signal and a temperature. The method further includes determining the pressure signal based on a selected motor speed parameter for a motor. The method further includes determining the selected motor speed parameter based on a gear shift signal, a current motor torque and an inertia of a rotating component. The method further includes calculating at least one of a drag correction based on the position of the piston and a previous position of the piston and a pressure feedback correction based on a difference between a current fluid pressure at the clutch and the pressure signal. The method further includes determining the pressure signal based on a selected motor speed parameter and a current motor speed parameter.

In another exemplary embodiment, a transmission of a vehicle is disclosed. The transmission includes an actuator device and a processor. The actuator device operates a clutch of the transmission and includes a piston. The processor is configured to receive a pressure signal indicative of a selected fluid pressure for operating the clutch, determine a position for the piston in the actuator device from the pressure signal, and move the piston to the position to operate the clutch at the selected fluid pressure.

In addition to one or more of the features described herein, the processor is further configured to determine the position from the pressure signal using a transfer function. The transfer function determines the position based on the pressure signal and a temperature. The processor is further configured to determine the pressure signal based on a selected motor speed parameter for a motor. The processor is further configured to determine the selected motor speed parameter based on a gear shift signal, a current motor torque and an inertia of a rotating component. The processor is further configured to calculate at least one of a drag correction based on the position of the piston and a previous position of the piston and a pressure feedback correction based on a difference between a current fluid pressure at the clutch and the pressure signal. The processor is further configured to determine the pressure signal based on a selected motor speed parameter and a current motor speed parameter of an electric motor.

In yet another exemplary embodiment, a vehicle is disclosed. The vehicle includes a clutch, an actuator device and a processor. The actuator device operates the clutch and includes a piston. The processor is configured to receive a pressure signal indicative of a selected fluid pressure for operating the clutch, determine a position for the piston in the actuator device from the pressure signal, and move the piston to the position to operate the clutch at the selected fluid pressure.

In addition to one or more of the features described herein, the processor is further configured to determine the position from the pressure signal using a transfer function. The transfer function determines the position based on the pressure signal and a temperature. The processor is further configured to determine the pressure signal based on a selected motor speed parameter for a motor. The processor is further configured to determine the selected motor speed parameter based on a gear shift signal, a current motor torque and an inertia of a rotating component. The processor is further configured to calculate at least one of a drag correction based on the position of the piston and a previous position of the piston and a pressure feedback correction based on a difference between a current fluid pressure at the clutch and the pressure signal.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
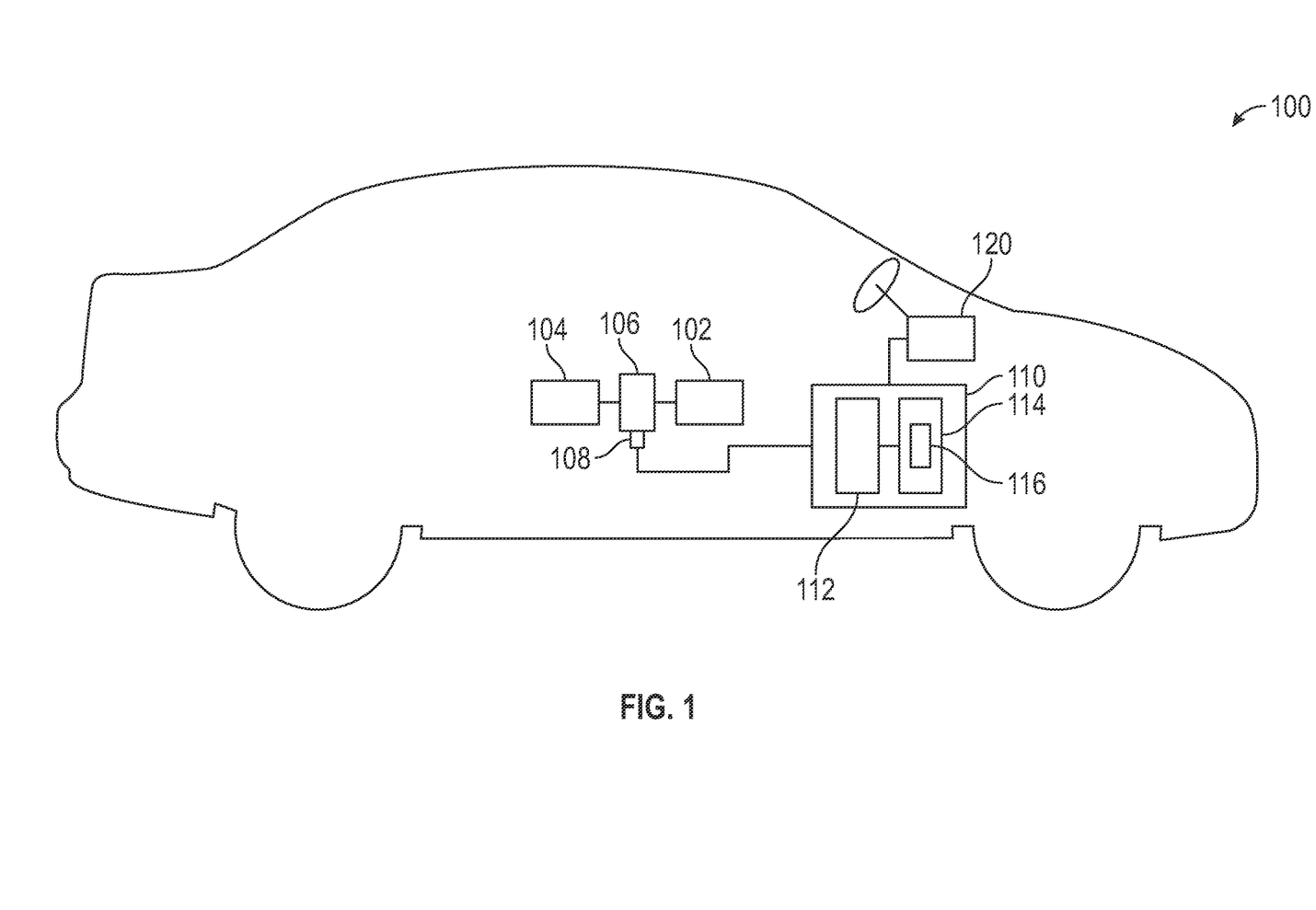
FIG. 1 shows an electric vehicle, in an exemplary embodiment.

In accordance with an exemplary embodiment, FIG. 1 shows an electric vehicle 100. The electric vehicle 100 includes an electric motor 102, transmission 104 and clutch 106. The electric motor 102 generates a torque that is transferred to wheels of the electric vehicle 100 via the transmission 104. The clutch 106 can engage and disengage the electric motor 102 and the transmission 104 to allow for shifting a gear state at the transmission. In various embodiments, an actuator device 108, or clutch actuator, engages and disengages the clutch 106.

The electric vehicle 100 further includes a controller 110. The controller 110 may include processing circuitry that may include an application specific integrated circuit (ASIC), an electronic circuit, a processor 112 (shared, dedicated, or group) and memory that executes one or more software or firmware programs, a combinational logic circuit, and/or other suitable components that provide the described functionality. The controller 110 may include a non-transitory computer-readable medium 114 that stores instructions 116 which, when processed by one or more processors of the controller 110, implement a method of operating the actuator device 108, according to one or more embodiments detailed herein. The controller 110 can also be in communication with various sensors (not shown) of the electric vehicle 100, including a sensor that detects a torque of the electric motor 102, a sensor that detects a gear state of the transmission 104, a sensor that detects a fluid pressure at the clutch 106, a sensor that detects a position of a piston of the actuator device 108, etc.

The electric vehicle 100 further includes a driver interface 120 through which a driver can input various driver commands, such as a gear shift instruction. The controller 110 can receive the driver commands and perform calculations based on the driver commands and data from the sensors.

Figure 2:
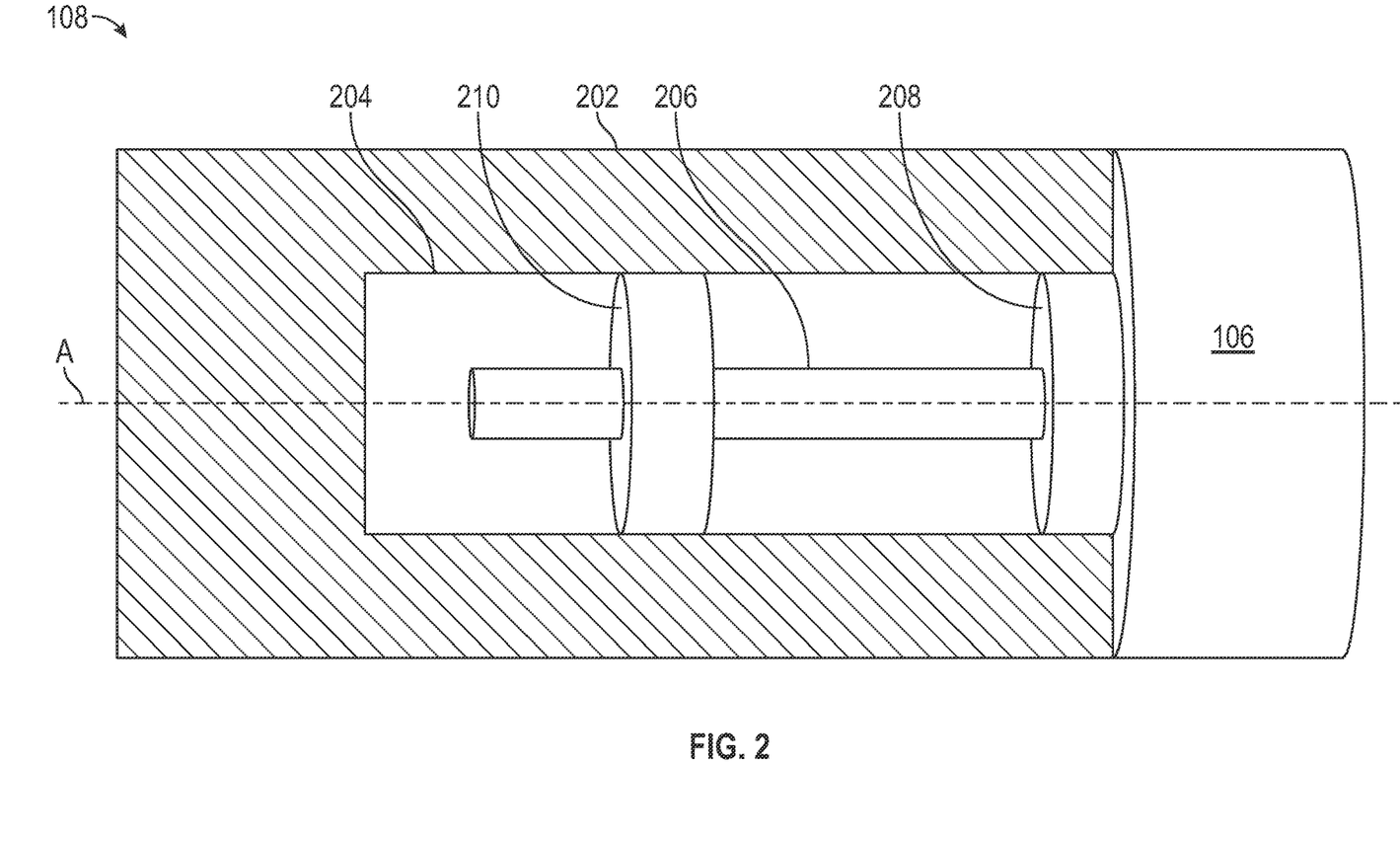
FIG. 2 schematically illustrates an actuator device of the vehicle, in an illustrative embodiment.

FIG. 2 schematically illustrates an actuator device 108, in an illustrative embodiment. The actuator device 108 is a position-based actuator that includes a housing 202 forming a chamber 204. A piston 206 is disposed in the chamber 204 along a longitudinal axis "A" of the chamber 204. The piston 206 is attached to a piston head 208 at one end and moves along the longitudinal axis of the chamber 204 to move the piston head. The piston head 208 is in communication with the clutch 106 and the position of the piston head in the chamber 204 affects the fluid pressure within the clutch. A solenoid 210 actuates the piston 206 to move the piston head 208 to a selected position in the chamber 204. The solenoid 210 can be controlled by a command from the controller 110.

Figure 3:
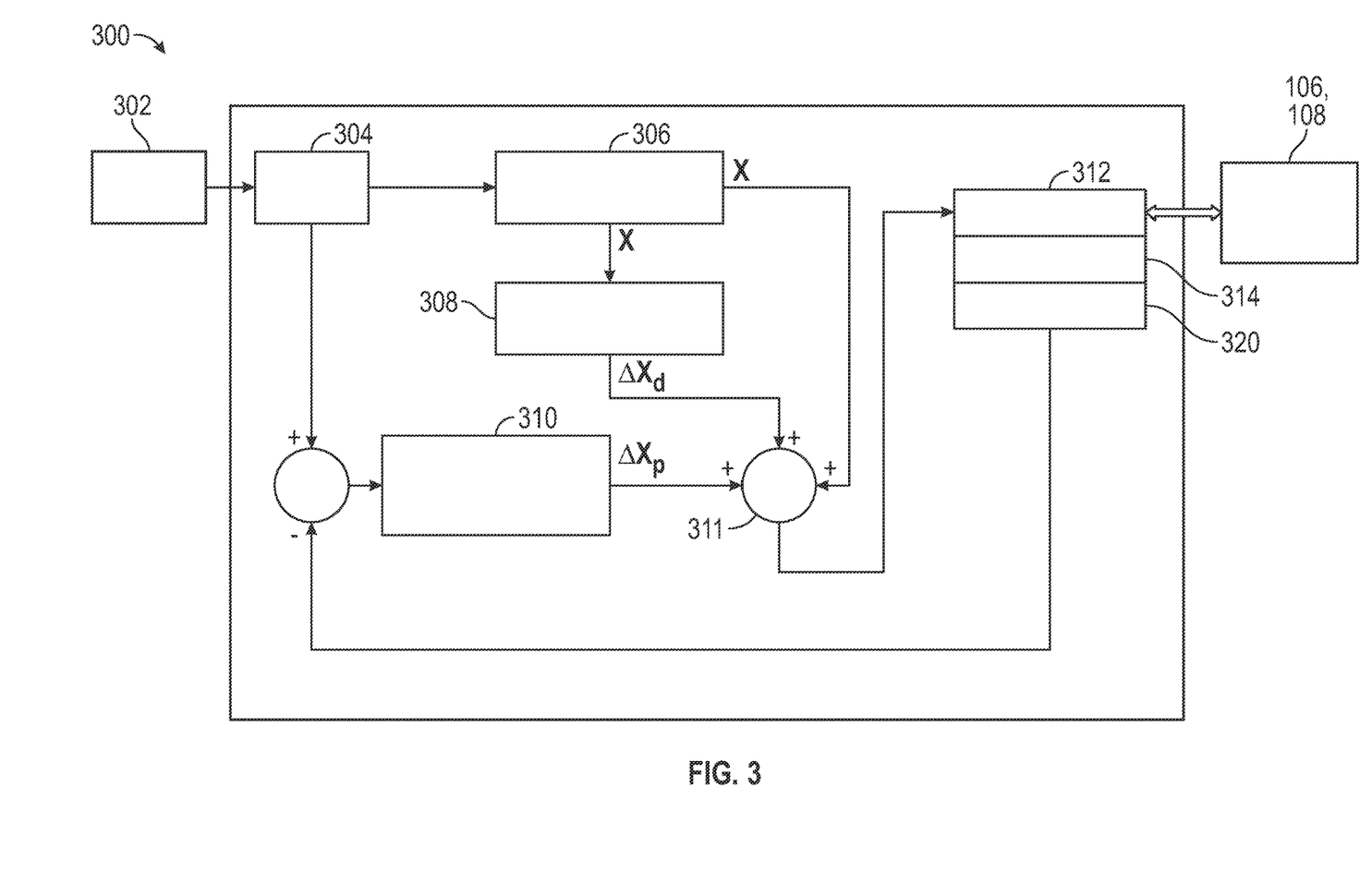
FIG. 3 shows a block diagram illustrating a method performed at a processor for operating the actuator device.

FIG. 3 shows a block diagram 300 illustrating a method performed at a processor for operating the actuator device 108, in an embodiment. In various embodiments, the method can be performed at the processor 112 of the controller 110. A pressure signal 302 indicating a desired fluid pressure at the clutch is received at pressure limiter 304. The pressure limiter 304 ensures that the desired fluid pressure is within an upper limit and lower limit for fluid pressure at the clutch 106 and replaces desired fluid pressure values that are outside of the limits with the appropriate limit values. The pressure signal is then sent to a position lookup table 306, which is used to translate the pressure signal to a position for the piston 206 of the actuator device 108. The position lookup table 306 stores piston positions based on pressure and/or temperature. In various embodiments, the position lookup table 306 can be a table having rows indicating pressure values and columns indicating temperature, wherein position values are field entries of the look up table.

The position lookup table 306 outputs a position X. The position is received at a hysteresis compensation module 308, which calculates a drag correction $\Delta X_d$ based on the position X and a previous position of the piston 206 within the chamber 204. In various embodiments, the position can be determined by entering the pressure signal into a transfer function that is based on pressure and/or temperature.

A pressure feedback correction module 310 performs calculations to output a pressure feedback correction $\Delta X_p$. The pressure signal 302 and a pressure feedback signal 320 are both provided as input to the pressure feedback correction module 310. The pressure feedback signal 320 indicates a current fluid pressure at the clutch 106. The pressure feedback correction module 310 determines a difference between the pressure signal 302 and the pressure feedback signal 320 and determines a pressure feedback correction $\Delta X_p$ based on this difference.

The position X, the drag correction $\Delta X_d$ and the pressure feedback correction $\Delta X_p$ are summed together at sum module 311 and the summation is provided to a position actuator module 312. The position actuator module 312 sends a position actuation signal 314 to the solenoid 210 of the actuator device 108 based on the summed positions to move the piston 206 to the indicated position. The position actuator module 312 receives a signal indicating the actual fluid pressure at the clutch and sends this signal to the pressure feedback correction module 310.

Figure 4:
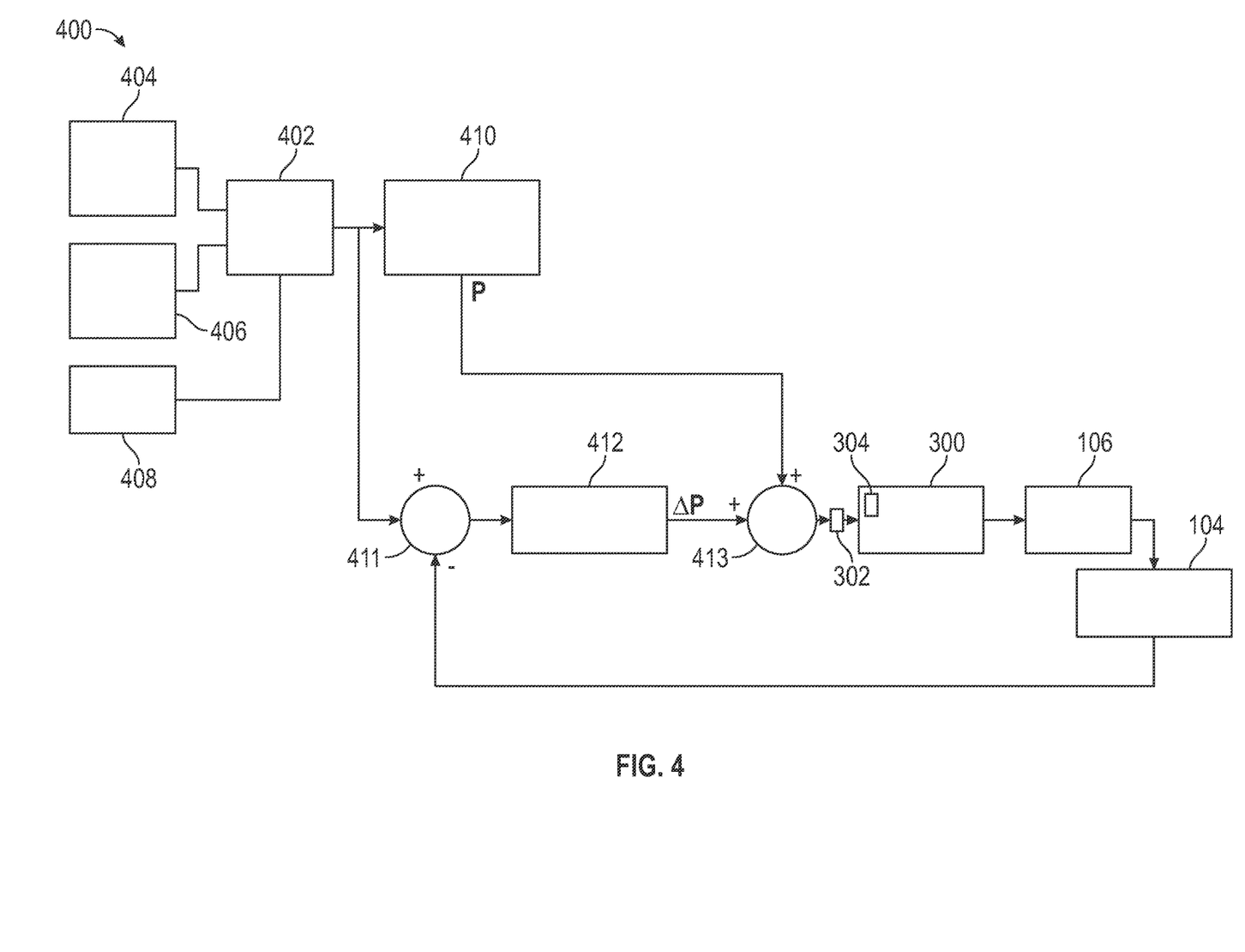
FIG. 4 shows a block diagram illustrating a method performed at a processor for translating a driver's input to an actuation of a clutch, in an illustrative embodiment.

FIG. 4 shows a block diagram 400 illustrating a method performed at a processor for translating driver's input at a driver interface 120 to an actuation of the clutch 106, in an illustrative embodiment. A motor speed calculator module 402 receives a gear shift signal 404, a current motor torque 406 and a current component inertia 408 (i.e., inertia of at least one rotating component of the clutch). The gear shift signal 404 can be received from the driver interface 120, while the current motor torque 406 and the current component inertia 408 can be received from various sensors. The motor speed calculator module 402 calculates a desired motor speed parameter for the electric motor 102 based on the input. The desired motor speed parameter can be a desired motor speed or a desired motor speed trajectory. The desired motor speed is sent to a clutch pressure determination module 410, which outputs a pressure P base on the desired motor speed. In addition, the desired motor speed is provided to a closed loop controller module 412. A difference circuit 411 determines a difference between the desired motor speed and the current motor speed. The closed loop controller module 412 calculates a pressure correction $\Delta P$ based on the difference. The current motor speed is provided from a sensor in the transmission 104 or transmission gearbox. The pressure P from the clutch pressure determination module 410 and the pressure correction $\Delta P$ from the closed loop controller module 412 are added together at a summing circuit 413 to provide the pressure signal 302 that is fed to the pressure limiter 304.

Figure 5:
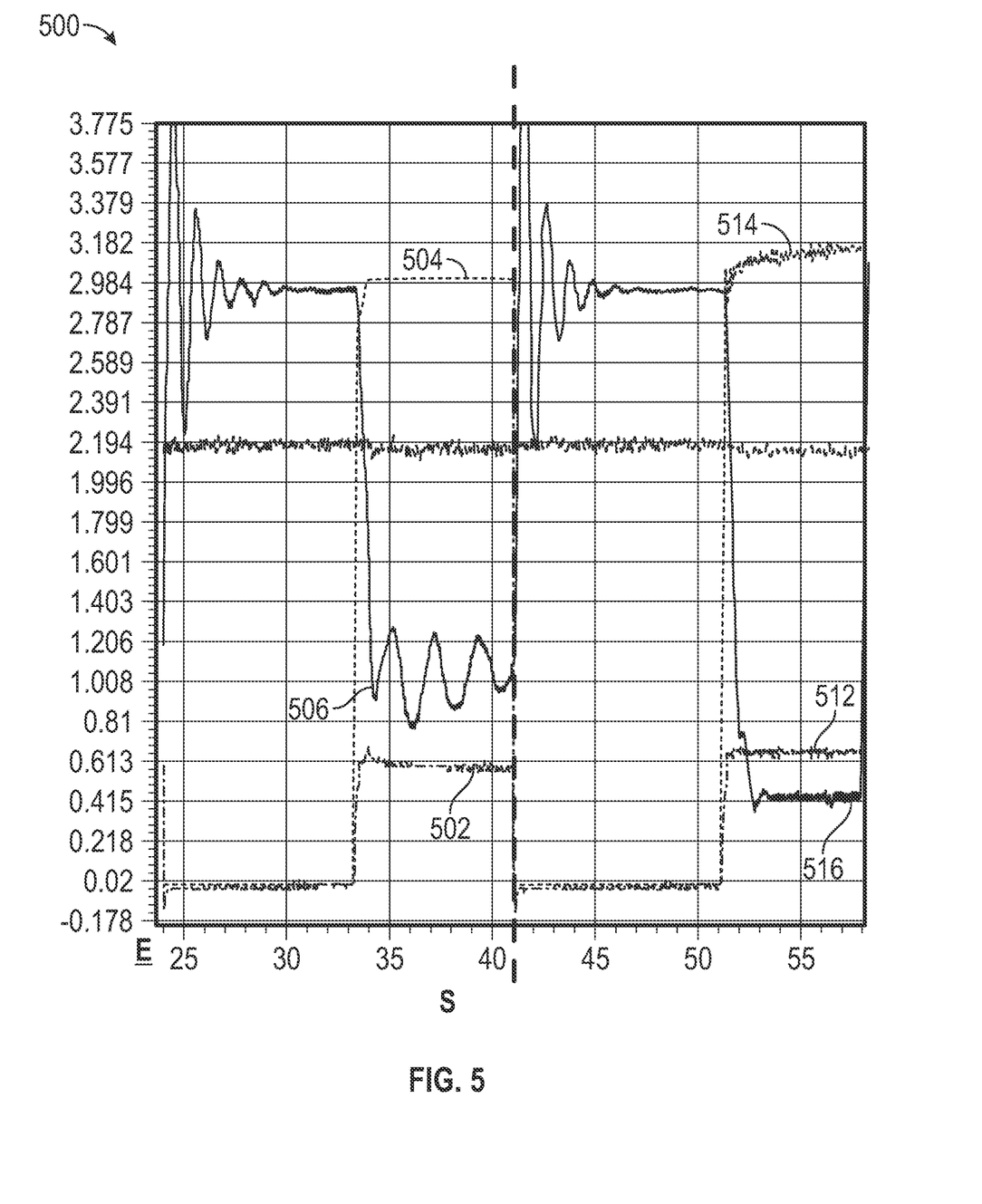
FIG. 5 shows a graph displaying various parameters involved in operation of a clutch and actuator device.

FIG. 5 shows a graph 500 displaying various parameters involved in operation of the clutch 106 and actuator device 108, in an illustrative embodiment. Time is shown along the abscissa in seconds. A first time domain $T_1$ between about t=24 seconds to about t=41 seconds represents operation of the clutch 106 without use of the methods disclosed herein. A second time domain $T_2$ between about t=41 seconds to about t–58 seconds represents operation of the clutch using the closed-loop system disclosed herein.

In the first time domain $T_1$, curve 502 represents the fluid pressure at the clutch, curve 504 represents a position of the piston 206, and curve 506 represents the motor speed. A gear shift occurs at about t=33 seconds. During the gear shift, the piston 206 shifts to a second position and maintains its position throughout. As a result, curve 506 shows that the motor speed exhibits a high level of fluctuation.

In the second time domain $T_2$, curve 512 represents the fluid pressure at the clutch, curve 514 represents a position of the piston 206, and curve 516 represents the motor speed. A gear shift occurs at about t=51 seconds. During the gear shift, the piston 206 shifts to a second position and shows adjustments in its position over time to achieve high pressure. As a result, curve 516 shows that the motor speed is able to reach a lower speed and exhibits lower fluctuation levels (in comparison to curve 506).

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method of operating a clutch of a vehicle, comprising:
   determining, at a processor, a selected motor speed parameter for a motor based on a gear shift signal, a current motor torque and an inertia of a rotating component of the clutch;
   determining, at the processor, a pressure signal based on the selected motor speed parameter, the pressure signal indicative of a selected fluid pressure for operating the clutch;
   determining, at the processor, a position for a piston of an actuator for the clutch, from the pressure signal; and
   moving the piston to the position to operate the clutch at the selected fluid pressure.

2. The method of claim 1, further comprising determining the position from the pressure signal using a transfer function.

3. The method of claim 2, wherein the transfer function determines the position based on the pressure signal and a temperature.

4. The method of claim 1, further comprising calculating at least one of: (i) a drag correction based on the position of the piston and a previous position of the piston; and (ii) a pressure feedback correction based on a difference between a current fluid pressure at the clutch and the pressure signal.

5. The method of claim 4, further comprising determining the pressure signal based on a selected motor speed parameter and a current motor speed parameter.

6. The method of claim 1, wherein the motor speed parameter is one of: (i) a desired motor speed; and (ii) a desired motor speed trajectory.

7. The method of claim 1, further comprising activating a solenoid to move the piston.

8. A transmission of a vehicle, comprising:
   an actuator device for operating a clutch of the transmission, the actuator device including a piston; and
   a processor configured to:
      determine a selected motor speed parameter based on a gear shift signal, a current motor torque and an inertia of a rotating component of the clutch;
      determine a pressure signal based on a selected motor speed parameter for a motor, wherein the pressure signal is indicative of a selected fluid pressure for operating the clutch;
      determine a position for the piston in the actuator device from the pressure signal; and
      move the piston to the position to operate the clutch at the selected fluid pressure.

9. The transmission of claim 8, wherein the processor is further configured to determine the position from the pressure signal using a transfer function.

10. The transmission of claim 9, wherein the transfer function determines the position based on the pressure signal and a temperature.

11. The transmission of claim 8, wherein the processor is further configured to calculate at least one of: (i) a drag correction based on the position of the piston and a previous position of the piston; and (ii) a pressure feedback correction based on a difference between a current fluid pressure at the clutch and the pressure signal.

12. The transmission of claim 11, wherein the processor is further configured to determine the pressure signal based on a selected motor speed parameter and a current motor speed parameter of an electric motor.

13. The transmission of claim 8, wherein the motor speed parameter is one of: (i) a desired motor speed; and (ii) a desired motor speed trajectory.

14. The system of claim 8, wherein the processor is further configured to activate a solenoid to move the piston.

15. A vehicle, comprising:
   a clutch; and
   an actuator device for operating the clutch, the actuator device including a piston; and
   a processor configured to:
      determine a selected motor speed parameter based on a gear shift signal, a current motor torque and an inertia of a rotating component of the clutch;
      determine a pressure signal based on a selected motor speed parameter for a motor, wherein the pressure signal is indicative of a selected fluid pressure for operating the clutch;
      determine a position for the piston in the actuator device from the pressure signal; and move the piston to the position to operate the clutch at the selected fluid pressure.

16. The vehicle of claim 15, wherein the processor is further configured to determine the position from the pressure signal using a transfer function.

17. The vehicle of claim 16, wherein the transfer function determines the position based on the pressure signal and a temperature.

18. The vehicle of claim 15, wherein the processor is further configured to calculate at least one of: (i) a drag correction based on the position of the piston and a previous position of the piston; and (ii) a pressure feedback correction based on a difference between a current fluid pressure at the clutch and the pressure signal.

19. The vehicle of claim 15, wherein the motor speed parameter is one of: (i) a desired motor speed; and (ii) a desired motor speed trajectory.

20. The vehicle of claim 15, wherein the processor is further configured to activate a solenoid to move the piston.

* * * * *